United States Patent [19]
Schulz

[11] Patent Number: 6,074,142
[45] Date of Patent: Jun. 13, 2000

[54] DEVICE FOR LOCKING A CONTAINER TO A VEHICLE CHASSIS

[76] Inventor: Gerd Schulz, Danziger Strasse 2, D-34289 Zierenberg, Germany

[21] Appl. No.: 09/117,119

[22] PCT Filed: Jan. 31, 1997

[86] PCT No.: PCT/EP97/00413

§ 371 Date: Jul. 22, 1998

§ 102(e) Date: Jul. 22, 1998

[87] PCT Pub. No.: WO97/28020

PCT Pub. Date: Aug. 7, 1997

[30] Foreign Application Priority Data

Feb. 2, 1996 [DE] Germany ............... 196 03 817

[51] Int. Cl.$^7$ ..................................................... B60P 7/08
[52] U.S. Cl. .................... 410/83; 410/82; 410/76
[58] Field of Search ............... 410/82, 83, 73, 410/76; 24/287; 248/500, 503, 681; 280/DIG. 8, 406.1

[56] References Cited

U.S. PATENT DOCUMENTS

| | | | |
|---|---|---|---|
| 3,682,423 | 8/1972 | Scarborough | 410/83 |
| 3,734,442 | 5/1973 | Lunde . | |
| 4,196,673 | 4/1980 | Looks | 410/89 |
| 4,419,034 | 12/1983 | DiMartino | 410/83 |
| 4,507,032 | 3/1985 | Rosaia | 410/83 |
| 4,776,736 | 10/1988 | Tatina | 410/83 |
| 5,160,224 | 11/1992 | Schwiebert | 410/82 |
| 5,356,249 | 10/1994 | Hove | 410/83 |
| 5,927,916 | 7/1999 | Kroll et al. | 410/83 |

FOREIGN PATENT DOCUMENTS

| | | |
|---|---|---|
| 301876 | 2/1989 | European Pat. Off. . |
| 3809834A1 | 11/1988 | Germany . |
| 91 14 903 U | 6/1993 | Germany . |
| 4422405 | 9/1995 | Germany . |
| 1283795 | 8/1972 | United Kingdom ............ 410/83 |

*Primary Examiner*—Stephen T. Gordon
*Attorney, Agent, or Firm*—Michael J. Striker

[57] ABSTRACT

In a device for locking a container to a vehicle chassis, having a housing (1), which on the housing side toward the container is provided with a protruding guide block (2); and having a rotary knob (3), which is supported in the housing (1) and which has a shaft (4), guided in the guide block (2), a hammerhead-shaped locking portion (5) protruding past the guide block (2), and an actuation portion (6) disposed on the opposite direction from the locking portion (5), the locking being effected by rotation of the rotary knob (3) about an actuation angle of approximately 90°, it is provided, in order to assure simple and secure actuation, that the guide block (2) has a rotation limiting portion (17) with at least two stops acting in the rotational direction; and that the rotary knob (3) has at least one radially protruding extension (22), which limits the rotation of the rotary knob (3) in both rotational directions, by contact with the respective stops of the rotation limiting portion (17), to the rotational range of the actuation angle between a locking position and a release position.

7 Claims, 3 Drawing Sheets

DEVICE FOR LOCKING A CONTAINER TO A VEHICLE CHASSIS

BACKGROUND OF THE INVENTION

The invention relates to a device for locking a container to a vehicle chassis, having a housing, which on the housing side toward the container is provided with a protruding guide block; and having a rotary knob, which is supported in the housing and which has a shaft, guided in the guide block, a hammerhead-shaped locking portion protruding past the guide block, and an actuation portion disposed on the opposite direction from the locking portion, the locking being effected by rotation of the rotary knob about an actuation angle of approximately 90°.

Locking devices of this kind are known. They can be rapidly released and secured upon transfer from the ship or railroad car to a vehicle or van carrier. Vehicles designed for transporting containers are therefore equipped with such twist locks. To secure them, the hammerhead-shaped upper part of the rotary knob is introduced into a corner casting that is mounted on all the corners of the container, and the knob is then twisted by 90°. To this end, the corner casting has an oblong slot on its underside, which receives the elongated head of the rotary knob. Shifting the head crosswise locks it and secures it against sliding out. This is the simplest way to secure containers on the transporting vehicle.

National guidelines, such as in the Federal Republic of Germany, require not only the locking described above but also an additional force-locking means of securing against unintentional release. To that end, in known devices, the rotary knob is additionally provided with a threaded fastening-down or tight-fastening device. For locking and securing, the user must first put the rotary knob in the locking position; this requires visual checking and possibly correction of the rotational position. After that, the securing nut must also be tightly screwed.

Using this kind of locking device that must be tightly screwed down is time-consuming and involves a risk of injury to the user that cannot be ignored, especially when a soiled or corroded screw device is being loosened. Because container transfers are generally done under constant time pressure, under all weather conditions, and at night when vision is poor, the known locking devices are considered disadvantageous.

SUMMARY OF THE INVENTION

The object of the invention is to improve a locking device of the type referred to at the outset for the sake of easy, fast operability.

The invention attains this object in that the guide block has a rotation limiting portion with at least two stops acting in the rotational direction; and that the rotary knob has at least one radially protruding extension, which limits the rotation of the rotary knob in both rotational directions, by contact with the respective stops of the rotation limiting portion, to the rotational range of the actuation angle between a locking position and a release position.

Embodying the rotary knob and the guide block according to the invention requires only little additional production cost. If there is a cast housing, then the features according to the invention for the guide block can be cast along with it at the same time.

Actuating the device no longer requires visual checking and readjustment, since the respective stop defines the precise locking position and release position, and the user can tell immediately when these positions are attained.

Advantageously, the actuation can therefore be accomplished very much faster and more safely. The work involved in transferring the containers can thus be improved perceptibly.

In a simple embodiment, it is provided that the stops are formed by two opposed parallel walls of the rotation limiting portion; and that the extension of the rotary knob has a cross section originating in a square basic shape with rounded corners, and two first rounded features extend opposite one another, spaced apart essentially by the spacing between the parallel walls, over an angular range of approximately 90°, and the remaining second rounded features have a greater spacing from one another. This simple embodiment assures perfect operation at low production cost.

In a feature of the invention it is provided that the rotation limiting portion has a rectangular cross section; and that the greater spacing of the second rounded features is substantially equal to the greater width of the rotation limiting portion. This provision advantageously means that providing stops according to the invention requires little space is required and does not consume much material.

In a further feature, a hand lever, intended for rotating the rotary knob and pivotably connected to the actuation portion and held in the immediate vicinity of a housing wall, in a position of repose oriented with the axis of the rotary knob, under spring force can be pivoted away from the housing counter to the spring force, in order to assure adequate freedom for the hands upon rotation out of the locking position into the release position or vice versa. Because the hand lever is disposed near the housing, the device becomes very compact, while the pivotability assures convenient use with negligible risk of injury. After use The invention is improved still further by the provision that the housing wall closest to the hand lever has at least one protrusion, on which protrusion or protrusions the hand lever can be locked in detent fashion in the locking position and/or the release position, in order to fix the lever against rotation. This security against twisting is attained practically without any additional expense for construction and production, and it protects the locking of the container absolutely securely against unintended loosening. The two detent options may be provided on two separately embodied protrusions or on two sides of a single protrusion that extends over the entire actuation course of the hand lever. Preferably, the protrusion or protrusions are formed simultaneously with the casting of the housing.

Activating or deactivating the twist prevention requires no additional work step. In operation of the locking system, the hand lever is already pivoted out of a position of repose counter to the spring force, in order to assure adequate freedom for the hands. The deactivation of the twist prevention occurs automatically, without further action on the part of the user. After rotating it into the locking or the release position, the user simply releases the hand lever. Because of the spring force, the lever then snaps back into its position of repose and in the process entirely automatically activates the twist prevention, by locking in detent fashion behind the protrusion according to the invention from the housing wall.

Another advantageous feature is that the rotary knob is kept axially pressed against the guide block by spring force. Upon motions of the container relative to the housing of the locking device, or if the corner casting is incorrectly placed on the top of the housing, the hammerhead-shaped locking portion of the resiliently retained rotary knob can go along with the motion or accomplish compensation for tolerances.

The invention can be still further improved in that the guide block, together with the rotary knob, can be lowered into the interior of the housing, so that the locking portion no longer protrudes from the housing. This provision enables the use of the locking device of the invention in arrangements, known per se, that have lowerable rotary knobs. Unlike the fixed embodiment, in this case the guide block is embodied separately and is disposed displaceably relative to the housing.

In a consistent further refinement of the simple, safe hand lever arrangement for use in devices with lowerable rotary knobs, it is provided that the guide block can be lowered into a lowered position by rotating the hand lever out of the release position counter to the rotational direction intended for the locking. In this embodiment, the rotary knob can be moved into the release position by rotating the hand lever by preferably 90° and moved to the lowered position by further rotation, preferably again by 90°, and vice versa.

Further advantages and details of the invention will become apparent from the ensuing description of exemplary embodiments in conjunction with the drawings.

DESCRIPTION OF PREFERRED DRAWINGS

Figure 1:
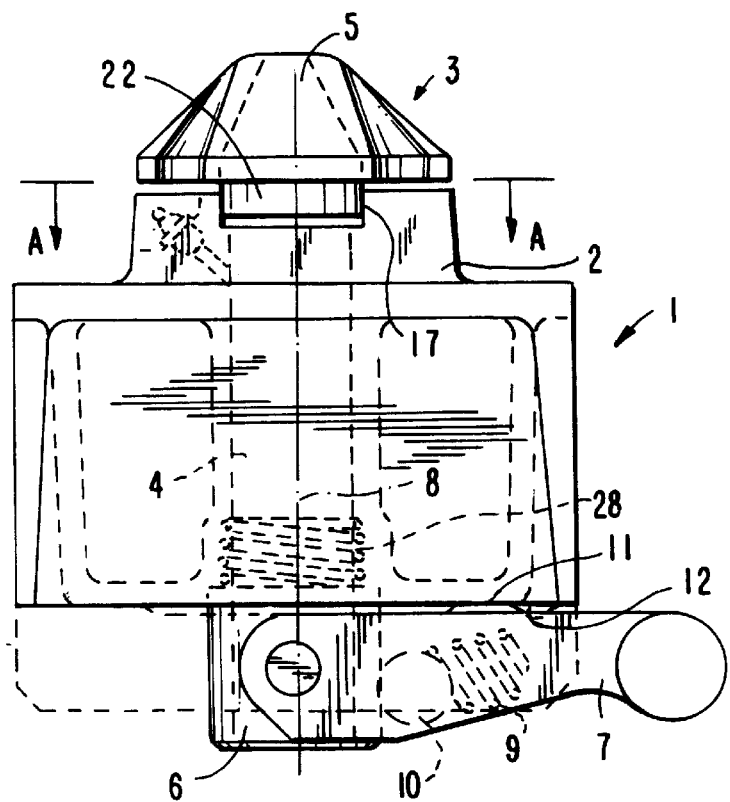
FIG. 1, a side view of a locking device according to the invention in a fixed embodiment, in the release position.

The locking device shown in FIG. 1 has a housing 1, which has a protruding guide block 2 on its top side. A rotary knob 3 is rotatably supported in the housing 1. The rotary knob has a shaft 4, which is guided in the guide block 2. On the upper end of the rotary knob 3, the shaft 4 merges with a locking portion 5, which protrudes at the top from the guide block 2. On the lower end, the shaft 4 merges with an actuation portion 6, which protrudes from the bottom of the housing 1.

A hand lever 7 is pivotably connected to the actuation portion 6 and is used to turn the rotary knob 3 about its longitudinal axis 8. The hand lever 7 is provided with a bore, in which a compression spring 9 and a ball 10 are disposed. The spring force presses the ball 10 against the actuation portion 6 of the rotary knob 3, and as a result the hand lever 7, in a horizontal position of repose transverse to the vertical longitudinal axis 8 of the rotary knob 3, is kept in contact with a lower housing wall 11 of the housing 1. The hand lever 9 can be pivoted downward away from the housing 1 by approximately 20° counter to spring force, in order upon actuation of the locking device to assure adequate freedom for the hands between the lever handle and the housing wall 11.

Figure 2:
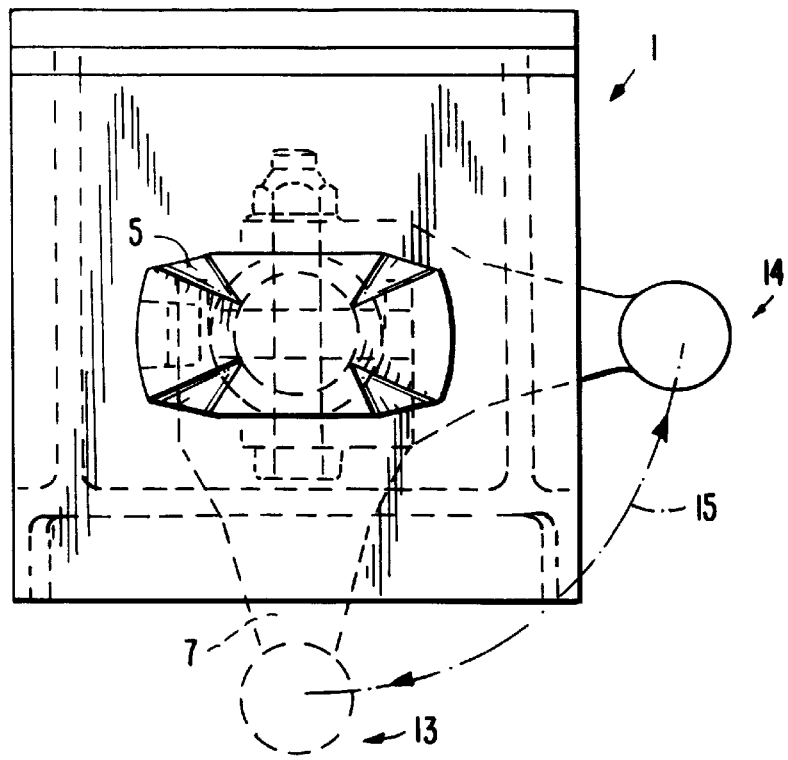
FIG. 2, a plan view on the locking device of FIG. 1.

For locking, the hand lever 7 is rotated out of a release position 13, shown in FIG. 2, is rotated by an actuation angle 15 of 90° into a locking position 14. In this process, the locking portion 5 of the rotary knob 3 rotates and with a corner casting 16, indicated in FIG. 5, of a container generates a form lock that firmly connects the container to the vehicle. To release the locking, the hand lever 7 is brought out of the locking position 14 into the release position 13 by rotation in the opposite direction.

As can be seen from FIG. 1, a protrusion 12 is formed on the housing wall 11, and the hand lever 7, when it is pressed by the spring force into its position of repose, locks in detent fashion in the locking position 14 behind this protrusion. A further protrusion, not shown, from the housing wall 11 is intended for detent locking of the hand lever 7 in the release position 13. In both positions 13, 14, unintentional loosening or locking is practically precluded by the detent locking of the hand lever 7 at the protrusions 12 intended for the purpose.

Figure 3:
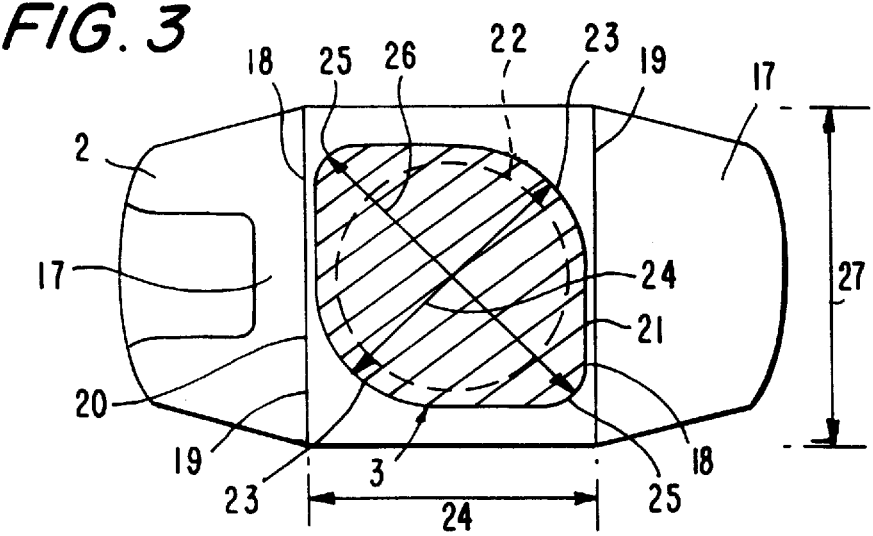
FIG. 3, a section taken along the line A—A of FIG. 1 in an enlarged fragmentary view.

To prevent rotation of the hand lever 7 in one direction of rotation past the locking position 14 and in the other direction of rotation past the release position 3, a rotation limiting portion 17 is formed on the guide block 2, as can be seen from FIG. 3; it has two stops 18, acting in one direction of rotation, and two stops 19, acting in the other direction of rotation, and these stops are formed in a simple way by two walls 20, 21 disposed parallel to and opposite one another.

As its counterpart the rotary knob 3 has a radially protruding extension 22, whose cross section can be imagined as originating in a square basic shape whose corners are then rounded off. This creates two first rounded features 23, which face one another substantially at the spacing 24 of the two parallel walls 20, 21 and span an angular range of 90°, and two further rounded features 25, which face one another at a greater mutual spacing 26, which is substantially equal to the greater width 27 of the rectangular rotation limiting portion 17. The rounded features 23, 25 merge with a respective one of a total of four straight contact faces, which are intended for contact with the stops 18, 19.

By the contact of the aforementioned contact faces of the extension 22 with the stops 18 or 19 of the rotation limiting portion 17, the rotation of the rotary knob 3 in the two directions of rotation is limited to the range of the actuation angle 15.

By the spring force of a second spring 28, the rotary knob 3 is pressed against the guide block 2, in order to compensate for positional tolerances and motions of the corner casting 16.

Figure 4:
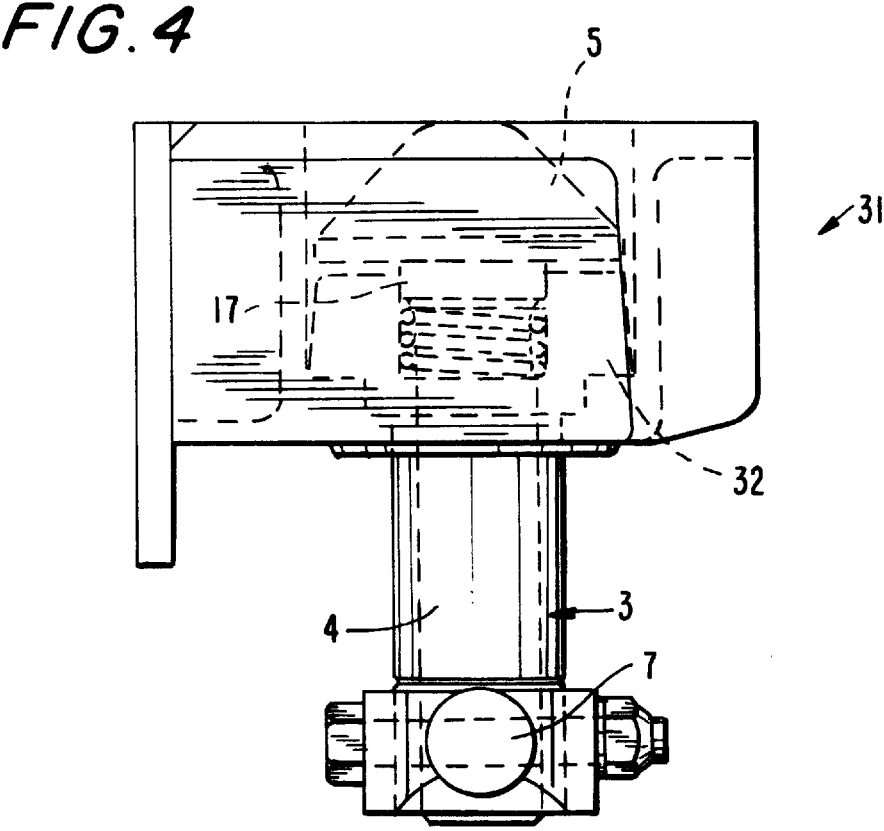
FIG. 4, a side view of a locking device according to the invention in a lowerable version, in the lowered position.
Figure 5:
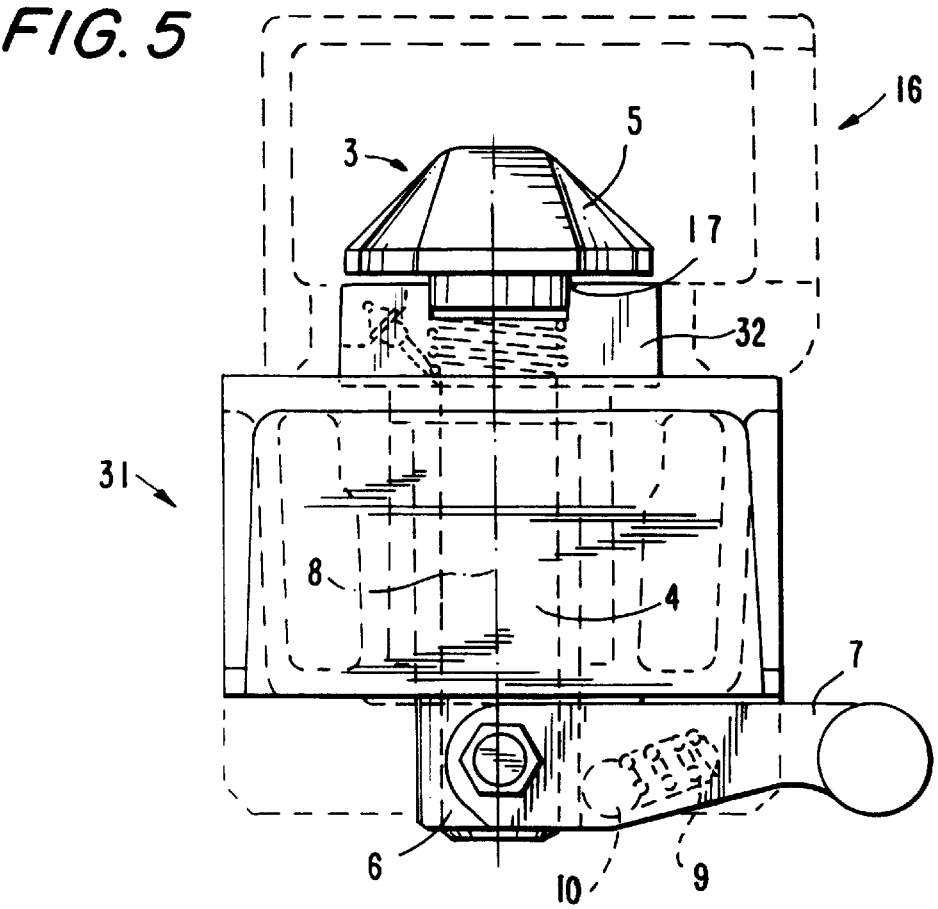
FIG. 5, a side view of the locking device of FIG. 4 in the release position.
Figure 6:
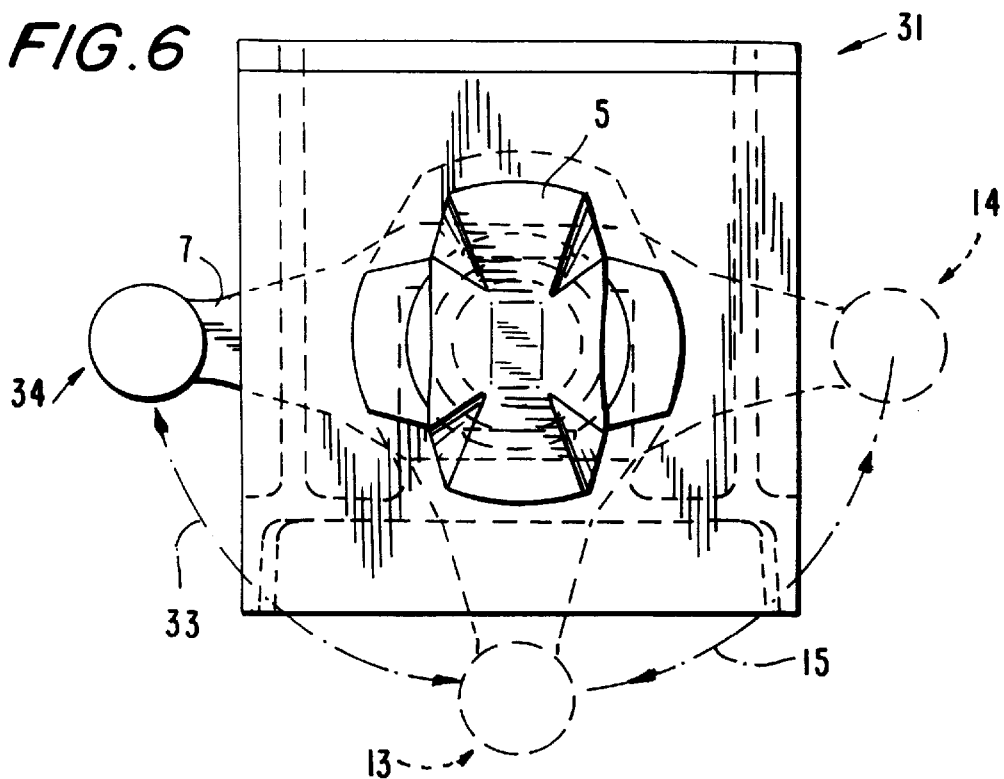
FIG. 6, a plan view of the locking device of FIG. 4.

In an embodiment of the invention shown in FIGS. 4–6, in a modified housing 31 a modified guide block 32 is disposed in lowerable fashion together with the rotary knob 3, so that the locking portion 5 no longer protrudes past the top of the housing 31 (FIG. 4). The lowering of the guide block 32 is done by rotating the hand lever 7 out of the release position 13 into a lowered position 34 by a rotational angle 33 of 90°, counter to the direction of rotation intended for the locking.

| List of Reference Numerals | |
| --- | --- |
| 1 | Housing |
| 2 | Guide block |
| 3 | Rotary knob |
| 4 | Shaft |
| 5 | Locking portion |
| 6 | Actuation portion |
| 7 | Hand lever |
| 8 | Longitudinal axis |

-continued

| List of Reference Numerals | |
|---|---|
| 9 | Compression spring |
| 10 | Ball |
| 11 | Housing wall |
| 12 | Protrusion |
| 13 | Release position |
| 14 | Locking position |
| 15 | Actuation angle |
| 16 | Corner casting |
| 17 | Rotation limiting portion |
| 18 | Stops |
| 19 | Stops |
| 20 | Wall |
| 21 | Wall |
| 22 | Extension |
| 23 | Rounded features |
| 24 | Spacing |
| 25 | Rounded features |
| 26 | Spacing |
| 27 | Width |
| 28 | Spring |
| 31 | Housing |
| 32 | Guide block |
| 33 | Rotation angle |
| 34 | Lowered position |

What is claimed is:

1. A device for locking a container to a vehicle chassis, comprising a housing (1, 31) which on a housing side toward the container is provided with a protruding guide block (2, 32); having a rotary knob (3), which is supported in the housing (1, 31) and which has a shaft (4), guided in the guide block (2, 32), a hammerhead-shaped locking portion (5) protruding past the guide block (2, 32), and an actuation portion (6) disposed on an opposite housing side, the locking being effected by rotation of the rotary knob (3) about an actuation angle (15) of approximately 90°, in that the guide block (2, 32) having a rotation limiting portion (17) with at least two stops (18, 19) acting in the rotational direction; the rotary knob (3) having at least one radially protruding extension (22), which limits the rotation of the rotary knob (3) in both rotational directions, by contact with the respective stops (18, 19) of the rotational limiting portion (17), to the rotational range of the actuation angle (15) between a locking position (14) and a release position (13), the stops (18, 19) being formed by two opposed parallel walls (20, 21) of the rotational limiting portion (17); and the extension (22) of the rotary knob (3) having a cross section originating in a square basic shape with rounded corners, and two first rounded features (23) forming some of the rounded corners extending opposite one another, spaced apart essentially by the spacing (24) between the parallel walls (20, 21), over an angular range of approximately 90°, and second rounded features forming the remainder of the rounded corners and having a greater spacing from another than the first rounded features.

2. The device of claim 1, characterized in that the rotary knob (3) is kept axially pressed against the guide block (2, 32) by spring force.

3. The device of claim 1, characterized in that the rotation limiting portion (17) has a rectangular cross section; and that the greater spacing (26) of the second rounded features (25) is substantially equal to a greater width (27) of the rectangular cross section of the rotation limiting portion (17).

4. The device of claim 1, characterized in that a hand lever (7), intended for rotating the rotary knob (3) is pivotably connected to the actuation portion (6) and held in the immediate vicinity of a housing wall (11), in a position of repose oriented with an axis (8) of the rotary knob, under spring force can be pivoted away from the housing (1, 31) counter to the spring force, in order to assure adequate freedom for hands upon rotation out of the locking position (14) into the release position (13) or vice versa.

5. The device of claim 1, characterized in that the guide block (32), together with the rotary knob (3), can be lowered into the interior of the housing (31), so that the locking portion (5) no longer protrudes from the housing (31).

6. A device for locking a container to a vehicle chassis, compromising a housing (1, 31) which on a housing side toward the container is provided with a protruding guide block (2, 32); having a rotary knob (3), which is supported in the housing (1, 31) and which has a shaft (4), guided in the guide block (2, 32), a hammerhead-shaped locking portion (5) protruding past the guide block (2, 32), and an actuation portion (6) disposed on an opposite housing side, the locking being effected by rotation of the rotary knob (3) about an actuation angle (15) of approximately 90°, in that the guide block (2, 32) having a rotation limiting portion (17) with at least two stops (18, 19) acting in the rotational direction; the rotary knob (3) having at least one radially protruding extension (22), which limits the rotation of the rotary knob (3) in both rotational directions, by contact with the respective stops (18, 19) of the rotational limiting portion (17), to the rotational range of the actuation angle (15) between a locking position (14) and a release position (13); a hand lever (7) intended for rotating the rotary knob (3), the hand lever (7) being pivotably connected to the actuation portion (6) and held in the immediate vicinity of a housing wall (11), in a position of repose oriented with an axis (8) of the rotary knob, under spring force can be pivoted away from the housing (1, 31) counter to the spring force, in order to assure adequate freedom for hands upon rotation out of the locking position (14) into the release position (13) or vice versa; a housing wall (11) closest to the hand lever (7) having at least one protrusion (12), on which protrusion or protrusions the hand lever (7) can be locked in detent fashion in the locking position (14) and/or the release position (13), in order to fix the lever against rotation.

7. The device of claim 6, characterized in that the guide block (32) can be lowered into a lowered position (32) by rotating the hand lever (7) out of the release position (13) counter to the rotational direction intended for the locking.

* * * * *